United States Patent [19]

Giencke et al.

[11] Patent Number: 5,521,267
[45] Date of Patent: May 28, 1996

[54] MIXTURES OF POLYMERS WITH WATER

[75] Inventors: Astrid Giencke, Hofheim; Petra Ulrich; Gerd Walz, both of Wiesbaden; Bernd Mergardt, Eltville, all of Germany

[73] Assignee: Hoechst Aktiengesellschaft, Frankfurt am Main, Germany

[21] Appl. No.: 301,024

[22] Filed: Sep. 6, 1994

[30] Foreign Application Priority Data

Sep. 10, 1993 [DE] Germany .......................... 43 30 767.1

[51] Int. Cl.⁶ ...................................................... C08F 8/42
[52] U.S. Cl. ...................... 526/201; 524/832; 525/327.8; 525/330.2; 525/368; 525/369; 526/203; 526/317.1; 526/318; 526/318.3
[58] Field of Search ................................. 526/317.1, 318, 526/318.3, 201, 203; 525/368, 369; 524/832

[56] References Cited

U.S. PATENT DOCUMENTS

| | | | |
|---|---|---|---|
| 3,301,829 | 1/1967 | Woodward et al. | 260/78.5 |
| 3,398,110 | 8/1968 | Klein et al. | 260/33.4 |
| 3,509,110 | 4/1970 | Di Giulio et al. | 526/317.1 |
| 4,151,143 | 4/1979 | Blank et al. | 260/29.6 |
| 4,170,582 | 10/1979 | Mori et al. | 260/29.6 RW |
| 4,301,266 | 11/1981 | Muenster et al. | 526/317.1 |
| 4,465,803 | 8/1984 | Nakayama | 524/460 |
| 4,774,303 | 9/1988 | Denzinger et al. | 526/328 |
| 4,996,274 | 2/1991 | Hsu | 526/328 |
| 5,130,369 | 7/1992 | Hughes et al. | 524/846 |

FOREIGN PATENT DOCUMENTS

| | | |
|---|---|---|
| 2066988 | 10/1992 | Canada. |
| 0047889 | 3/1982 | European Pat. Off.. |
| 0068024 | 1/1983 | European Pat. Off.. |
| 0134995 | 3/1985 | European Pat. Off.. |
| 0181037 | 5/1986 | European Pat. Off.. |
| 92/14763 | 9/1992 | WIPO. |

Primary Examiner—Bernard Lipman
Attorney, Agent, or Firm—Foley & Lardner

[57] ABSTRACT

Emulsifier-free synthetic resins and mixtures of synthetic resins with water are used as binders for water-borne printing inks and printing varnishes. The resins contain: (a) a polymer resin A containing acid groups which may have been neutralized or partially neutralized and can be prepared by in-situ polymerization of ethylenically unsaturated compounds containing acid groups with further ethylenically unsaturated compounds and condensation with monohydroxy compounds and, if desired, neutralization or partial neutralization, and (b) if desired, a water-insoluble polymer resin B in the form of latex particles which can be prepared by emulsion polymerization of ethylenically unsaturated compounds in the presence of the polymer resin A.

15 Claims, No Drawings

MIXTURES OF POLYMERS WITH WATER

BACKGROUND OF THE INVENTION

1. Field of the Invention

The present invention relates to water-soluble and water-insoluble resins. The present invention also relates to synthetic resins and dispersions which contain the water-soluble and water-insoluble resins, and are free of low-molecular-weight emulsifiers. The synthetic resins can be used as binders in water-borne paints for printing processes. The present invention also relates to processes for their preparation and to their use.

2. Description of the Related Art

It is generally known that copolymers comprising monomers having acidic groups along with other monomers, are used as binders for aqueous printing inks and printing varnishes. In order to make these resins water-soluble or water-dispersible, they have usually been partially or completely neutralized with bases. In the aqueous phase, they exhibit a high absorption capacity for pigments and/or fillers and can also be used as polymer emulsifiers fillers emulsion polymerization to produce dispersions. These resin solutions and dispersions are then applied to substrates by conventional printing methods, frequently after the addition of water-soluble organic solvents which act as flow-improving or film-forming agents and, if also desired, after pigmenting. Examples of substrates are paper, wood, metal, sheets and/or other plastics.

EP-B 0,068,024 discloses, for example, acid synthetic resins based on styrene, α-methylstyrene and acrylic acid, which in principle are suitable for preparing water-borne inks and dispersions. A disadvantage of these commercially available products is their insufficient emulsifying power, which limits the absorption capacity for pigments and hydrophobic polymers.

EP-A 0,047,889 discloses polymer dispersions in which polar synthetic resins of low molecular weight and high acid number provide stabilization for relatively unpolar styrene/acrylate copolymers. When incorporated in printing varnishes and printing inks, resins of this type lead to insufficient rheological properties (viscosity/shearing stability) and their polarity results in insufficient pigment dispersing power and insufficient water resistance.

U.S. Patent No. 4,151,143 describes emulsifier-free acrylate dispersions obtained by grafting salts of acid synthetic resins with unsaturated monomers during emulsion polymerization. Since the acid synthetic resins used contain a relatively low molar proportion of carboxyl-containing monomers, the only dispersions obtainable by this method are those having a high proportion of partly water-dilutable acrylates and hydroxyacrylates, which leads to a reduction of the block and water resistance of the water-borne inks prepared using such dispersions.

U.S. Patent No. 4,465,803 discloses preparing water-soluble resins via solution polymerization and then using these resins for preparing dispersions via emulsion polymerization. The formation of emulsion addition polymers produces chemical bonds between reactive side groups of the resin and the emulsion addition polymer, as a result of which these dispersions are in reality no longer bi- or multimodal and thus, due to a lack in rheological properties, for example low shearing stability, are no longer suitable for use as binders for preparing varnishes and inks for printing processes.

Emulsifier-free polymer dispersions prepared by emulsion polymerization of unsaturated unpolar monomers in the presence of highly polar polyelectrolyte polymers also form the subject-matter of EP-A 0,511,520. However, for use as a binder base in aqueous printing inks, these systems are still in need of improvement with respect to their emulsifying capacity in emulsion polymerizations and with respect to their printing properties (see the comparative example which follows), since the insufficient emulsifying power of the polyelectrolyte polymers requires that the proportion of the polar polymers is at least 29% by weight of the total solids content. This leads to disadvantages, for example, during drying and with respect to the water and block resistance in aqueous systems in the printing sector.

SUMMARY OF THE INVENTION

One object of the present invention is to provide aqueous resin solutions and dispersions which can be used as binder components of high-quality water-borne inks and water-borne varnishes in the printing sector and do not have the disadvantages of the prior art.

Another object of the present invention is to provide a water-soluble polymer resin. Still another object of the present invention is to provide a water-insoluble polymer resin made from an emulsion of the water-soluble polymer resin. Yet another object of the present invention is to provide a process for the production of the water-soluble polymer resin and the product produced therefrom. Still another object of the present invention is to provide a process for the production the water-insoluble polymer resin and the product produced therefrom.

Still another object of the present invention is to provide a synthetic resin made from a combination of the water-soluble and water-insoluble polymer resins.

In accomplishing the foregoing objects, there has been provided according to one aspect of the present invention, a water-soluble polymer resin which includes ethylenically unsaturated monomer units which carry acid groups and further unsaturated monomer units. The polymer resin has an acid number of about 160 to about 290, a weight average molecular weight of about 300 to about 100,000, and a glass transition temperature of about 55° to about 160° C.

Another aspect of the present invention provides a process for the production of the water-soluble polymer resin and the product produced therefrom. The process includes, polymerizing ethylenically unsaturated monomers which comprise acid groups and further ethylenically unsaturated monomers by condensation with monohydroxy compounds to form the water-soluble polymer resin.

Still another aspect of the present invention provides a process for the production of a water-insoluble polymer resin and the product produced therefrom. The process includes polymerizing monomers in the presence of at least one of a free radical starter or a redox catalyst system, in an emulsion solution, to form the water-insoluble resin polymer. The emulsion solution includes the at least partially neutralized water-soluble polymer of the present invention.

Yet another aspect of the present invention provides a synthetic resin which includes a combination of the water-soluble and water-insoluble polymers according to the present invention.

Still another aspect of the present invention provides a water borne printing ink and varnish which includes the synthetic resin according to the present invention.

Further objects, features and advantages of the present invention will become apparent to those skilled in the art from the detailed description of the preferred embodiments which follows.

DETAILED DESCRIPTION OF THE PREFERRED EMBODIMENTS

The present invention comprises producing a specific polymer resin A containing acid groups via in-situ polymerization and condensation in the presence of monohydroxy compounds, which is immediately introduced into water containing a neutralizing agent to give a viscous resin solution. In this resin solution, a polymer B can be produced by addition of unpolar monomers, this polymer B being obtained in the form of latex particles.

The present invention also provides emulsifier-free synthetic resins and mixtures of synthetic resins with water. The synthetic resins contain:

(a) a polymer resin A containing acid groups which may have been neutralized or partially neutralized and can be prepared by in-situ polymerization of ethylenically unsaturated compounds containing acid groups with further ethylenically unsaturated compounds and condensation with monohydroxy compounds and, if desired, the resin A has been neutralized or partially neutralized; and (b) if desired, a water-insoluble polymer resin B in the form of latex particles which can be prepared by emulsion polymerization of ethylenically unsaturated compounds in the presence of the polymer resin A.

The present invention also provides a process for preparing emulsifier-free synthetic resins and mixtures of synthetic resins with water. The process includes the steps of:

(a) preparing a polymer resin A containing acid groups by in-situ polymerization of ethylenically unsaturated compounds containing acid groups with further ethylenically unsaturated compounds and condensation with monohydroxy compounds, followed, if desired, by neutralization or partial neutralization, and (b) if desired, preparing a water-insoluble polymer resin B in the form of latex particles by emulsion polymerization of ethylenically unsaturated compounds in the presence of the polymer resin A which, if desired, has been neutralized or partially neutralized.

The present invention also provides polymer resins A, per se, containing acid groups which can be prepared by in-situ polymerization of ethylenically unsaturated compounds and condensation with monohydroxy compounds, salts thereof, and solutions thereof in water.

At least in their partially neutralized form, the type A polymers are to be classified as polymer surfactants and exhibit particularly good emulsifying properties in water. Unlike conventional low-molecular-weight surfactants and emulsifiers on the one hand and protective colloids on the other, the polymer surfactants usable according to the present invention are often designated as stabilizers. The emulsifying action and the specific solution behavior of the polymer stabilizers usable according to the present invention are determined on the one hand by the molecule size and, on the other, by the molecule architecture, i.e., the amount and distribution of charged, polar and unpolar portions.

The relative number and proportion of comonomer units, the type of monohydroxy compounds incorporated by esterification, the acid number, the molecular weight, the glass transition temperature and the polymerization method are important for the properties of the polymer resins A according to the present invention.

In contrast to the previously known methods, the polymerization according to the present invention is preferably carried out in a mixture of alkanols and monoetherified polyalkylene oxide compounds and, if desired, cycloalkanols or lactones. Thus, the comonomers and monohydroxy compounds are reacted at temperatures of about 180° to about 240° C., preferably at about 190° to about 220° C., and the water of reaction formed is preferably immediately separated off.

The reaction is preferably carried out at constant temperature under atmospheric pressure with simultaneous removal of the low-boiling components, although it may also be carried out at a superatmospheric pressure of up to about 15 bar, preferably of up to about 5 bar. In order to complete esterification, toward the end of the reactions the residual water of reaction is preferably removed in vacuo.

The acid numbers (mg of KOH/g) of the products are preferably in the range from about 160° to about 290°, more preferably about 195° to about 275°. The proportion of hydroxy compounds bonded according to the invention in the form of ester groups is between about 0.4 and about 25, preferably between about 0.8 and about 18,% by, weight. It is preferably attempted to obtain a weight-average molecular weight of about 300 to about 100,000, more preferably about 800 to about 40,000, in particular about 1000 to about 25,000. The glass transition temperature of the polymers is between about 55° and about 160° C., preferably about 65° and about 130° C., in particular 75° and 125° C.

The compounds which can be used for incorporating carboxylic acid groups in the type A polymer are preferably unsaturated mono- or dicarboxylic acids or mixtures thereof. The unsaturated monocarboxylic acids used are preferably acrylic acid, methacrylic acid and/or crotonic acid, individually or in a mixture. These also include monoesters of maleic and fumaric acid with saturated alcohols containing 1 to 10 carbon atoms. Unsaturated dicarboxylic acids include dicarboxylic acids containing 4 to 6 carbon atoms, for example maleic acid, itaconic acid, mesaconic acid, fumaric acid, methylenemalonic acid, citraconic acid, salts thereof or, if desired, anhydrides thereof. However any other compound suitable for incorporating carboxylic acid groups in the type A polymer can also be used.

Suitable comonomers for the carboxyl-containing monomers are basically all ethylenically unsaturated compounds polymerizable by free radicals. Hydrophobic monomers, for example vinylaromatics or open-chain conjugated dienes, are preferably used. Examples include styrene, vinyltoluene, α-methylstyrene, ethylstyrene, iso-propylstyrene, tert-butylstyrene, 2,4-dimethylstyrene, diethylstyrene, o-methyl-p-isopropylstyrene, halostyrenes, such as chlorostyrene, fluorostyrene and iodostyrene, 2,4-cyanostyrene, hydroxystyrene, nitrostyrene, aminostyrene and/or phenylstyrene. However any other suitable vinylaromatic can be used. Preference is given in particular to styrene, vinyltoluene and α-methylstyrene. Open-chain dienes include 1,3-butadiene, 2-methyl-1,3-butadiene, 2,3-dimethyl-1,3-butadiene, pentadiene, 2-neopentyl-1,3-butadiene and substituted 1,3-butadienes, such as 2-chloro-1,3-butadiene, 2-cyano-1,3-butadiene, substituted straight-chain conjugated pentadienes, straight-chain and branched conjugated hexadienes, other straight-chain or branched conjugated dienes usually containing 4 to 9 carbon atoms and mixtures thereof. However, any other suitable open-chain conjugated diene can be used.

In order to obtain specific properties, it is also possible to use further starting monomers, for example esters of acrylic, methacrylic and crotonic acid with saturated alcohols containing 1 to 12 carbons on the alcohol portion, individually or in a mixture. Examples include methyl methacrylate, ethyl acrylate, butyl acrylate, 2-ethylhexyl acrylate.

Further optionally usable comonomers are acrylamide, methacrylamide, 2-acrylamido-2-methylpropanesulfonic acid, acrylamidosulfonic acid, vinyl acetate, vinylsulfonic acid, allylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methyl-2-imidazoline and/or mixtures thereof. Those monomers from this group containing acid groups can be used in the copolymerization in the form of the free acid or else in a form partially or completely neutralized with alkali metal bases or ammonium bases. The basic acrylates, for example diethylaminoethyl acrylate, are neutralized with acid or are quaternized and then used in the copolymerization. Furthermore, it is possible to use vinyl esters of α,α-dialkylalkanemonocarboxylic acids, for example vinyl esters of versatic acid, and of course also vinyl acetate and vinyl propionate. These modifying monomers are used for obtaining specific properties of the resin A and constitute an amount effective to obtain the desired property, preferably about 0 to about 10% by weight, more preferably about 0 to about 4% of the copolymer structure.

According to the invention, monohydroxy compounds are generally understood to mean monoalcohols and monoetherified polyalkylene oxide compounds. Building in these monohydroxy compounds into polymer A according to the invention considerably improves the dispering capacity of said polymer.

The monoalcohols which can be used are preferably those containing alkane or cycloalkane radicals, preferably ($C_8$ to $C_{32}$)-alcohols and isomers thereof, for example 2-ethylhexanol, octanol, nonanol, decanol, dodecanol, furthermore stearyl alcohol, cetyl alcohol, ceryl alcohol, myricyl alcohol, TCD® alcohol M (Hoechst, MW=166, OH number 327), wool wax alcohols, cholesterols, borneols, isoborneols and tall oil fatty alcohols.

Optionally, for modifying the properties, it is also possible to use ($C_1$–$C_6$)-alcohols containing alkane and cycloalkane chains in amounts of about 0 to about 35% by weight, relative to the proportion of monohydroxy compounds, for example butanol, hexanol, cyclohexanol and/or mixtures thereof.

The monoetherified polyalkylene oxide compounds used are preferably polyalkylene oxide compounds of the formula

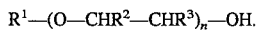

$R^1$—(O—$CHR^2$—$CHR^3$)$_n$—OH.

In this formula, $R^1$ is preferably an alkyl cycloalkyl or phenyl radical, more preferably an alkyl radical having 1 to 12, in particular 1 to 4, carbon atoms, $R^2$ and $R^3$ are preferably hydrogen or alkyl radicals having 1 to 4 carbon atoms, and n can be an integer from 1 to 10, preferably 1 to 4. Examples of such compounds include: methylglycol, ethylglycol, butylglycol, methyldiglycol, ethyldiglycol, butyldiglycol, methyltriglycol, ethyltriglycol, butyltriglycol, methyltetraglycol, ethyltetraglycol, butyltetraglycol, Polyglycol®-M-250 (Hoechst, MW=260–275, OH number 204–215), Polyglycol®-M- 350 (Hoechst, MW=335–265, OH number 154–167), propylene glycol methyl ether, dipropylene glycol methyl ether, tripropylene glycol methyl ether, propylene glycol n-butyl ether, dipropylene glycol n-butyl ether, tripropylene glycol n-butyl ether, and propylene glycol phenyl ether.

Optionally, cyclic esters can also be used addition to the monohydroxy compounds. These esters preferably contain four or more carbon atoms in the ring, with it being possible for the ring carbon atoms to also contain, instead of hydrogen, other substituents, such as alkyl, cycloalkyl, aryl, aralkyl, alkoxy. They include monoalkyl-substituted ε-caprolactones, such as monomethyl-, monoethyl-, monopropyl-, monoisopropyl-, monoethylhexyl-, monodecyl-, monododecyl-ε-caprolactone; furthermore dialkyl-ε-caprolactones in which the two alkyl groups can be present on the same or on two different, but not both on the ε-carbon atom; furthermore trialkyl-ε-caprolactones in which two or three carbon atoms in the ring are substituted, as long as the carbon atom does not contain two substituents; furthermore alkoxy-ε-caprolactones, such as methoxy- and ethoxy-ε-caprolactone; furthermore cycloalkyl-, aryl- and aralkyl-ε-caprolactones, such as cyclohexyl-, phenyl-acid benzyl-ε-caprolactone. Preference is given to the unsubstituted ε-caprolactone.

Other cyclic esters can optionally be used in the context of the invention and contain at least one internal ester capable of ring opening. Further cyclic esters are γ-butyrolactone, γ-valerolactone, ethylene carbonate, tetramethylene -carbonate, 2,2-dimethyl-4-phenyl-1,3-dioxolan-5-one, α-n-propyl-δ-valerolactone, δ,δ-dimethyl-δ-valerolactone, 3-ethyl-1,4-dioxan-2-one, 3,3,6-trimethyl-1,4-dioxan-2-one, tetramethylglycolide, tetraphenylglycolide, 3-oxa-ε-caprolactone, β-propiolactone, α,α-bis(chloromethyl)propiolactone, β-butyrolactone, pivalolactone (PVL), thiobutyrolactone (TBL), δ-valerolactone (DVL), α,β,γ-trimethoxy-δ-valerolactone, 1,4-dithiane-2,5-dione, trimethylene carbonate, neopentyl carbonate, ethyleneoxolane, β-methyl-ε-iso-propyl-ε-caprolactone, propyleneoxolane, 4-hydroxycyclohexanecarboxylic acid lactone, cis-disalicylide and trisalicylide, and mixtures thereof. Preferred cyclic esters are γ-butyrolactone, δ-valerolactone, pivalolactone, thiobutyrolactone, δ-butyrolactone, ε-caprolactone and mixtures thereof.

The polymerizations can be initiated by means of the thermally decomposing radical-forming agents known to one skilled in the art, preferably from the series of azo compounds, peroxides, peracid esters or hydroperoxides. Preference is given to the use of organic peroxides, preferably dialkyl peroxides, in particular di-tert-butyl peroxide. However, any suitable radical-forming agent can be used.

Optionally, for controlling the copolymerization, the reaction can be carried out with the addition of a solvent which is removed in vacuo after completion of the reaction. The amount of solvent is preferably up to about 25% by weight, in particular up to about 10% by weight, relative to the polymer A. The solvent to be preferably used is 3-ethoxyethyl propionate which under the reaction conditions reacts as a masked ethyl acrylate.

After at least partial neutralization with bases, the copolymers A can be dissolved in water and can thus very advantageously be used as binders for aqueous printing inks or as stabilizers for emulsion polymerization. Examples of bases useful to neutralize copolymers are ammonia or amines, preferably tri-, di- or monoalkylamines, for example triethanolamine, morpholine, or alkanolamines, such as 2-amino-1-methyl-1-propanol, or alkali metal hydroxides or alkaline earth metal hydroxides or mixtures thereof. In general, it is sufficient to preferably carry out a partial neutralization of about 50 to about 90% although particular preference is given to excess neutralization to a pH of about 7.5 to about 10, more preferably about 8 to about 9.

To prepare a solution of the at least partially neutralized resin on a production scale, inverse dilution, i.e., direct introduction of the resin melt of the type A copolymer in water/neutralizing agent at a resin temperature of preferably about 100° to about 250° C., more preferably about 150° to about 220° C., and at least at atmospheric pressure, has proven to be advantageous. Advantageously, the aqueous mixture is then preferably maintained at about 80°–95° C., more preferably at about 90° C., and preferably at least at atmospheric pressure for preferably about 30 minutes to about 3 hours.

Optionally, in particular in the case of high-viscosity resin melts having a high glass transition temperature, low-molecular-weight organic acids, preferably saturated aliphatic carboxylic acids and/or glycol ethers can be added thereto in order to significantly reduce the melt viscosity. Advantageous amounts for this purpose are preferably up to about 20% by weight of additives, relative to the resin content. Although any suitable carboxylic acid can be used, preferred carboxylic acids are formic acid, lactic acid, malonic acid, succinic acid, tartaric acid or citric acid, preferably acetic acid. Glycol ethers include ethers of ethylene glycol, propylene glycol, butylene glycol, for example 2-n-propoxyethanol, 2-(1-methylethoxyethanol), 2-n-butoxyethanol, 2-(2-methoxyethoxy)ethanol, 2-(2-ethoxyethoxy)ethanol, 2-(2butoxyethoxy)ethanol, triethylene glycol monomethyl ether, tetraethylene glycol monomethyl ether, 2,5,8,11-tetraoxadodecane, 1-methoxy-2-propanol, 1-ethoxy-2-propanol, tripropylene glycol monomethyl ether. Preferably, 2-(2-ethoxyethoxy)ethanol and/or 1-methoxy-2-propanol are used. However, any other suitable glycol ether can be used. Inverse dilution is usually carried out in the complete absence of solvents.

According to another aspect of the invention, the synthetic resin mixtures optionally also contain, apart from the polymer resins A, polymer resins B. Polymer resins B are prepared via emulsion polymerization in the presence of at least partially neutralized polymer resin A. On the one hand, the polymer A stabilizers should be present in an amount sufficient for achieving the desired emulsifying effect. On the other hand, the proportion of stabilizers A should not be too high, not only for economic reasons but also for the purpose of affecting the application properties of the synthetic resin mixtures to be prepared. Accordingly, the stabilizer A content used is preferably about 4 to about 56% by weight, in particular about 10 to about 50% by weight, relative to the sum amount of polymers A and B. Best results are obtained by using preferably about 12 to about 42% by weight of stabilizers A, relative to the sum of A and B.

Emulsion polymerization processes are known to one of ordinary skill in the art. They are usually distinguished by the fact that free radical polymerization of ethylenically unsaturated monomers is carried out in the aqueous phase in the presence of free radical starters and emulsifiers, protective colloids or other stabilizers. The components mentioned can be introduced into the emulsion polymerization in various ways. When polymer resins A according to the invention are used as stabilizers in emulsion polymerization processes, the good emulsifying power of these polymers makes the presence of low-molecular-weight surfactants and protective colloids unnecessary.

Usually the major portion of the aqueous phase is introduced at the beginning, and portions of water can be added during the reaction in the form of a free radical starter solution or a monomer pre-emulsion. Stabilizers can be introduced in their entirety or in part at the beginning, and the rest can be metered in during polymerization. The monomers can be introduced in their entirety at the beginning or can be metered in pure form or as a pre-emulsion in water. In most cases, a portion of the free radical starter is introduced at the beginning and the other portion is metered in as an aqueous solution. The initial charge is understood to mean the mixture introduced into the reactor before setting the reaction temperature at, typically, about 20° to about 99° C.

In most cases, the polymerization is initiated by thermal decomposition of the free radical starters or by redox systems and is considered to be complete when the major portion of the monomers which can be reacted by a free radical chain reaction has reacted. In this process, about 0.001 to about 0.1% by weight of residual monomers usually remain as residue.

Other processes or process variants are described, for example, in detail in Ullmann, Enzyklopädie der technischen Chemie [*Encyclopedia of Industrial Chemistry*], 4th edition, Verlag Chemie, Weinheim (1980), Volume 19, pages 132 ff., which is hereby incorporated by reference; and in *Encyclopedia of Polymer Science and Engineering,* Volume 6, Wiley & Sons, New York 1986, pages 1–51, which is also hereby incorporated by reference.

Polymer B of the dispersion is produced by monomers of which at least a significant portion of the monomers used are sparingly soluble in water and also remain sparingly soluble upon a change in pH. Sparingly soluble is understood to mean a solubility of less than about 10% by weight, in particular less than about 5% by weight, at about 25° C., based on the total weight of the monomers. The proportion of sparingly soluble monomers must be at least such that the resulting emulsion addition polymer is insoluble in the water phase under the polymerization conditions, and is present in the form of dispersed particles. For the purposes of the invention, the mixtures used are preferably those comprising at least about 70% by weight and in particular at least about 90% by weight of sparingly soluble monomers.

Suitable sparingly soluble monomers contain at least one ethylenically unsaturated group. The terms ethylenically unsaturated, vinylically unsaturated and $\alpha,\beta$-unsaturated are used synonymously. One skilled in the art knows that such monomers can be linked to one another under the conditions of emulsion polymerization in an aqueous medium to give polymers. Examples of these include vinyl compounds, styrenes, acrylates, derivatives thereof. However, any other suitable ethylenically unsaturated monomer can be used. Examples of suitable vinyl compounds include vinyl chloride and vinyl esters, such as vinyl acetate, vinyl propionate, vinyl esters of versatic acid and of course also vinyl esters of fatty acids, such as vinyl laurate. However, any other suitable vinyl compound can be used. Suitable styrene compounds are styrene, vinyltoluene, $\alpha$-methylstyrene, ethylstyrene, iso-propylstyrene, tert-butylstyrene, 2,4-dimethylstyrene, diethylstyrene, o-methyl-p-iso-propylstyrene, halostyrenes, such as chlorostyrene, fluorostyrene and iodostyrene, 2,4-cyanostyrene, hydroxystyrene, nitrostyrene, aminostyrene and/or phenylstyrene. Preference is given in particular to styrene, vinyltoluene and $\alpha$-methylstyrene. However, any other suitable styrene compound can be used. Examples of suitable acrylates include acrylic, methacrylic and crotonic esters and also, for example, esters containing hydroxyl functions, such as hydroxyethyl acrylate and hydroxyethyl methacrylate. Any other suitable acrylate can also be used. In emulsion polymerization, it is of course also possible to polymerize mixtures of such ethylenically unsaturated monomers, as long as they are suitable for copolymerization. In order to obtain dispersions having glass transition temperatures of more than about 75° C., it is preferred to use styrene or styrene derivatives and/or methacrylates as the starting material.

Suitable initiators are preferably typically water-soluble free radical-forming compounds, for example hydrogen peroxide, peracetic acid, perbenzoic acid and perdisulfates, for example potassium peroxodisulfate or ammonium peroxodisulfate, perphosphates, peroxycarbonates and hydroperoxides, such as tert-butyl hydroperoxide. Other suitable initiators can also be used. Examples of suitable redox catalyst systems are sodium persulfate/ sodium formaldehyde sulfoxylate, cumene hydroperoxide/sodium metabisulphite, hydrogen peroxide/ascorbic acid and sulfur dioxide/ ammonium persulfate. Also suitable are azo compounds, such as 4,4-azobis(cyanopentanoic acid). The catalysts are used in the usually catalytically active concentrations. These are generally between about 0.01 and about 4.0% by weight, relative to the dispersion.

In specific embodiments, further components customary for emulsion polymerization can optionally be used. Examples of these are accelerators, buffers and any other components which can be used, in addition to the polymer stabilizers according to the present invention, in the emulsion polymerization reaction mixture. These customary components have been disclosed in the prior art of emulsion polymerization processes described above. Examples of these are $Fe^{2+}$ salts which, in combination with sodium formaldehyde sulfoxylates, have an accelerating effect on the free radical formation of free radical starters. Salts which act as buffers, for example phosphates, carbonates, citrates, may also optionally be used for stabilizing the pH. Such additives can preferably be present in the dispersion in an amount of up to about 3% by weight. When carrying out emulsion polymerization, it has proven to be particularly advantageous if, in addition to adjusting the concentration of the liquor, a prepolymerization of about 1 to about 15% by weight of the initiator and monomer amount is carried out since this allows a more precise control of the quality of the dispersion, in particular with respect to transparency and viscosity. The weight is based on the total amount of initiator and monomer, respectively.

Another aspect of the present invention relates to the use of the synthetic resins and the mixtures of the synthetic resins with water for preparing binder vehicles for waterborne printing inks and printing varnishes for printing paper, paperboard, cardboard and the like. For example, the synthetic resins and mixtures thereof with water can be used in the coloring unit of a sheet- or web-fed offset press, damping units, separate varnishing units of sheet- or web-fed offset presses, sheet-fed varnishing machines, gravure and flexographic presses or in any other suitable application.

When the resin solutions and dispersions according to the present invention are used as binder vehicles for printing varnishes and printing ink, their solids content generally are about 40 to about 75% by weight. These varnishes and inks preferably contain about 1 to about 70% by weight of dispersions according to the present invention and/or about 1 to about 40% by weight of solid resins according to the invention and about 0 to about 60% by weight of glycols or glycol ethers, about 0 to about 30% by weight of wetting agents, about 0 to about 35% by weight of neutralizing agents (bases), about 0 to about 30% by weight of natural and/or synthetic waxes, about 0 to about 2.5% by weight of antifoams, about 0 to about 80% by weight of water and about 0 to about 60% by weight of pigments. All weight percentages are based on the total weight of the varnish and/or ink.

The pigment/binder ratio in grinding operations is generally between about 5:95 and about 95:5, preferably about 30:70 to about 70:30. For use as pigment grinding components, solids contents of greater than about 30% by weight are also advantageous. Mixtures of various types of dispersions or resin solutions are also advantageous for preparing these stock dyes, pigments and printing inks. For incorporating pigments (for example titanium dioxide, colored pigments, synthetic carbon blacks), fillers (for example talc, China clay, waxes), dyes and flow-improving agents in the solutions and/or dispersions and/or mixtures thereof and/or dilutions thereof, the customary milling, mixing, kneading and grinding apparatuses can be used in the optional presence of customary dispersing aids.

The preparation of suitable stabilizers which can be used according to the present invention and the preparation of stable polymer dispersions by emulsion polymerization and their use in printing inks and printing varnishes are illustrated by the examples below.

EXAMPLES

In the examples, parts and percentages are by weight unless stated otherwise. All reactions are carried out under an inert gas atmosphere ($N_2$). However, any other gas which provides an inert atmosphere can also be used.
Stabilizers/resin solutions:

Example 1

A mixture of dodecanol (33.3 g), tetraethylene glycol monomethyl ether (66.6 g), styrene (13.9 g), α-methylstyrene (15.8 g), acrylic acid (20.4 g), di-tert-butyl peroxide (2.2 g) and butanol (2.6 g) is heated to 200° C. under nitrogen ($N_2$). A mixture of styrone (278.1 g), α-methylstyrene (315.2 g) and acrylic acid (406.6 g), and simultaneously a mixture of di-tert-butyl peroxide (38.4 g) and butanol (47.4 g), is metered in at 200° C. over a period of 5 hours while continuously distilling off water and cleavage products from the initiator. After another hour at 200° C., volatiles are separated off in vacuo (up to about 100 mbar). Cooling and discharging give a solid resin having an acid number of 216 and a melting point of 113° C. or, after introducing the resin melt at about 190° C. into water (5425.3 g)/25% ammonia (344.2 g), followed by dissolution at 90° C., an approximately 17% resin solution.

Example 2

(a) Styrene (684.9 g), α-methylstyrene (777.5 g), acrylic acid (1253.4 g), and (b) di-tert-butyl peroxide (134.1 g) in butanol (butanol 129.3 g) are metered synchronously via separate feed lines to a mixture of dodecanol (129.3 g) and tetraethylene glycol monomethyl ether (258.5 g). The reaction mixture of "(a)" and "(b)" is continuously stirred under nitrogen at a constant temperature of 200° C. over a period of about 6 hours. At the same time, low-boiling components and water are distilled off at the top. Stirring at 195° C. is then continued for half an hour, volatiles are separated off in vacuo, and tetraethylene glycol monomethyl ether (274.6 g) and acetic acid (183.0 g) are added with continuous cooling of the reaction mixture to about 150° C. This is immediately followed by slow introduction of the melt into thoroughly mixed ammonia water (deionized water: 5398.4 g and 25% ammonia: 1144.0 g) and complete dissolution of the polymers at about 90° C. This gives an approximately 30% resin solution having a pH of about 8.7 and an Ubbelohde viscosity of about 200 mPa.s.

Example 3

A mixture of dodecanol (20.0 g), tetraethylene glycol monomethyl ether (55.0 g), styrene (19.5 g), α-methylstyrene (22.1 g), acrylic acid (33.5 g), di-tert-butyl peroxide (3.6 g) and butanol (3.6 g) is heated to 200° C. under nitrogen ($N_2$). A mixture of styrene (252.9 g), α-methylstyrene (286.9 g) and acrylic acid (435.3 g), and simultaneously, a mixture of di-tert-butyl peroxide (46.4 g) and butanol (46.4 g), is metered in at 200° C. over a period of 5 hours while continuously distilling off water and cleavage products from the initiator. After a further hour at 200° C., volatiles are separated off in vacuo. Cooling and discharging give a solid resin having an acid number of about 245 and a melting point of about 123° C. After adding 1-methoxy-2-propanol (134.5 g) with simultaneous cooling to about 170° C. and introduction of this composition into water (4591.2 g)/25% ammonia (363.3 g), followed by dissolution at 90° C., an approximately 18% resin solution is obtained.

In contrast to the resins of EP-B 0,068,024, the resins according to the present invention show at least 3 resonance lines in the $^{13}C$ nuclear magnetic resonance spectrum in the region from 18 to 36 ppm, which are produced by the presence of alkyl chains in the polymer. Furthermore, the resins according to the invention have increased emulsifying and dispersing power, for example for polystyrene (see comparative example).

Dispersions:

Example 4

874.2 g of the 17% resin solution from Example 1 is, if required, brought to a pH of 9.1 with 25% ammonia and then heated to 90° C. under nitrogen. After reaching 90° C., styrene (10.0 g) and in parallel ammonium peroxodisulfate (0.4 g) in water (5.0 g) are added, and the resulting mixture is stirred at 90° C. for 20 minutes. Simultaneously, styrene (440.0 g) and ammonium peroxodisulfate (1.5 g) in water (40.0 g) are then metered in over a period of about 3 hours. The mixture is allowed to after-react for about 1 hour, if desired with the addition of a redox system, and cooled to give a clear, speckle-free dispersion having a solids content of about 43.0% and a viscosity of about 70 mPa.s.

Example 5

A resin solution from Example 2 (621.3 g) is diluted to a polymer content of 24% and adjusted to a pH of 8.9 with ammonia and heated to 90° C. Styrene (225.0 g) and ammonium peroxodisulfate (1.0 g) in deionized water (40.0 g) are then metered synchronously but via separate feed lines into the resin solution over a period of 3 hours. The resulting mixture is allowed to afterreact for about 1 hour and cooled to give a dispersion having a solids content of about 42.6% and a viscosity of about 220 mPa.s.

Example 6

The 18% resin solution from Example 3 (6768.5 g) is, if required, adjusted to a pH of about 9.1 with 25% ammonia and then heated to 90° C. under nitrogen. After reaching 90° C. styrene (83.3 g) and ammonium peroxodisulfate (3.33 g) in water (41.7 g) are simultaneously added, and the resulting mixture is stirred at 90° C. for 20 minutes. Additional styrene (3666.7 g) and ammonium peroxodisulfate (16.7 g) in water (333.0 g) are then simultaneously metered in over a period of about 3 hours. The resulting mixture is allowed to afterreact for about 1 hour, if desired with the addition of a redox system, and cooled to give a speckle-free dispersion having a solids content of about 45% and a viscosity of about 250 mPa.s (by the method of Ubbelohde) and giving a clear runoff.

Comparative Example

A 17% resin solution according to EP-B 0,068,024 (acid number (AN)=222) (150.0 g) in water (678.5 g) and 25% ammonia (44.4 g) is, if required, adjusted to a pH of 9.1 with 25% ammonia and then heated to 90° C. under nitrogen. After reaching 90° C., styrene (10.0 g) and ammonium peroxodisulfate (0.4 g) in water (5.0 g) are simultaneously added, and the resulting mixture is stirred at 90° C. for 20 minutes. Additional styrene (440.0 g) and ammonium peroxodisulfate (1.5 g) in water (40.0 g) are simultaneously then metered in over a period of about 3 hours. The mixture is allowed to afterreact for about 1 hour, if desired with the addition of a redox system, and cooled to give a cloudy dispersion which is difficult to filter and has a solids content of about 42% by weight, a viscosity of about 20 mPa.s and a high percentage of coarse material (speckles).

Exemplary procedure for preparing a gloss overprint varnish:

57 parts of a dispersion from Example 6, 1 part of water and 2 parts of butyldiglycol are added to 40 parts of a 30% resin solution from Example 1, and the resulting mixture is vigorously mixed. This water-borne varnish of a solids content of about 36% exhibits a DIN flow-time of about 16 s (4 mm/23° C.).

Exemplary procedure for preparing a pigmented printing ink:

82 parts by weight of a 33% aqueous ammoniacal solution of the resin from Example 1 are shaken together with 17 parts of Permanent Yellow* GRX, 0.1 part of antifoam and 0.9 part of water at room temperature in a paint shaker in the presence of glass beads for 30 minutes. Screening through a 100 μm screen gives a stock ink which after being diluted with dispersions from Example 5 to a pigment content of 7% gives a water-borne ink suitable for the printing sector.

What is claimed is:

1. A process for the production of a water-soluble polymer resin, comprising:

radical initiated polymerizing in the absence of an added solvent ethylenically unsaturated monomers which comprise acid groups and further ethylenically unsaturated monomers by in-situ condensation with monohydroxy compounds to form said water-soluble polymer resin, wherein the monomers which comprise acid groups are selected from the group consisting of a monocarboxylic acid, a dicarboxylic acid, a mixture thereof, salts thereof and anhydrides thereof, and wherein the further ethylenically unsaturated monomers are polymerizable by free radicals.

2. A process for the production of a water-soluble resin as claimed in claim 1, wherein said resin is formed as a resin melt, and said process further comprises, at least partially neutralizing the acid groups present in said resin melt after polymerization.

3. A process for the production of a water-soluble resin as claimed in claim 2, wherein said at least partial neutralization comprises introducing said resin melt into an aqueous solution of water and a neutralizing agent.

4. A process for the production of a water-soluble polymer resin as claimed in claim 3, further comprising adding at least one of a low-molecular weight organic acid and a glycol ether to said polymer resin melt before said resin melt is introduced into said aqueous solution.

5. A process for the production of a water-soluble resin as claimed in claim 3, wherein the introducing of said resin melt into said aqueous solution further comprises introducing said resin melt at a temperature of about 100° to about 250° C. into said aqueous solution to form an aqueous mixture, and maintaining said aqueous mixture at about 80° to about 95° C. for about 0.5 to about 3 hours.

6. A process for the production of a water-soluble resin as claimed in claim 1, wherein the monohydroxy compound is selected from the group consisting of a monoalcohol, a monoetherfied polyalkylene oxide compound and a mixture thereof.

7. A process for the production of a water-soluble resin as claimed in claim 1, wherein the further ethylenically unsaturated monomers are hydrophobic monomers.

8. A process for the production of a water-soluble resin as claimed in claim 7, wherein the hydrophobic monomers are selected from the group consisting of an open-chain conjugated diene, a vinyl aromatic and a mixture thereof.

9. A process for production of a water-soluble resin as claimed in claim 1, wherein the polymerization is carried out at about 180° to about 240° C., and the water formed by said condensation is immediately separated from the polymerization reaction.

10. A process for the production of a water-soluble polymer resin as claimed in claim 1, wherein the monomers which comprise acid groups are selected from the group consisting of acrylic acid, methacrylic acid, crotonic acid, monoesters of maleic acid with saturated alcohols containing 1 to 10 carbon atoms, monoesters of fumaric acid with saturated alcohols containing 1 to 10 carbon atoms, maleic acid, itaconic acid, mesaconic acid, fumaric acid, methylenemalonic acid, citraconic acid, salts thereof and anhydrides thereof.

11. A process according to claim 1, wherein the radical initiated polymerizing is carried out in the absence of a chain transfer agent.

12. A process according to claim 1, wherein no solvents are present in the radical initiated polymerization.

13. A process for the production of a combination of a water-soluble polymer resin and a water-insoluble resin, comprising:
  (a) radical initiated polymerizing in the absence of an added solvent ethylenically unsaturated monomers which comprise acid groups and further ethylenically unsaturated monomers by in-situ condensation with monohydroxy compounds to form said water-soluble polymer resin in the form of a melt, wherein the monomers which comprise acid groups are selected from the group consisting of a monocarboxylic acid, a dicarboxylic acid, a mixture thereof, salts thereof and anhydrides thereof, and wherein the further ethylenically unsaturated monomers are polymerizable by free radicals;
  (b) at least partially neutralizing the acid groups present in said resin melt after the radical initiated polymerization to form at least partially neutralized water-soluble polymers;
  (c) forming an emulsion which includes the at least partially neutralized water-soluble polymer; and
  (d) polymerizing in the emulsion solution, monomers in the presence of at least one of a free radical starter and a redox catalyst system, to form said water-insoluble resin polymer.

14. A process for the production of a combination of a water-soluble resin and a water-insoluble polymer resin as claimed in claim 13, wherein said at least partially neutralized water-soluble polymer is present in an amount of about 10 to about 50% by weight, based on the combined amount of the water-insoluble polymer resin and the water-soluble polymer resin.

15. A process for the production of a combination of a water soluble resin and a water-insoluble polymer resin as claimed in claim 13, wherein the monomers comprise sparingly soluble monomers, and the sparingly soluble monomers comprise at at least about 70% by weight of the total weight of the water-insoluble polymer.

* * * * *